US011884551B2

(12) United States Patent
Allain Najman et al.

(10) Patent No.: US 11,884,551 B2
(45) Date of Patent: *Jan. 30, 2024

(54) PRECIPITATED SILICA AND PROCESS FOR ITS MANUFACTURE

(71) Applicant: RHODIA OPERATIONS, Paris (FR)

(72) Inventors: Emmanuelle Allain Najman, L'Hay les Roses (FR); Fabien Stocklouser, Francheville (FR); Pascaline Garbey, Saint Didier au Mont d'Or (FR); Caroline Fayolle, Lyons (FR); Sylvaine Neveu, Paris (FR); Laurent Guy, Sathonay-Camp (FR)

(73) Assignee: RHODIA OPERATIONS, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/611,157

(22) PCT Filed: May 3, 2018

(86) PCT No.: PCT/EP2018/061302
§ 371 (c)(1),
(2) Date: Nov. 5, 2019

(87) PCT Pub. No.: WO2018/202752
PCT Pub. Date: Nov. 8, 2018

(65) Prior Publication Data
US 2020/0079654 A1    Mar. 12, 2020

(30) Foreign Application Priority Data

May 5, 2017 (EP) .................................... 17305510

(51) Int. Cl.
| | | |
|---|---|---|
| *C01B 33/193* | (2006.01) | |
| *B01J 21/08* | (2006.01) | |
| *B01J 35/10* | (2006.01) | |
| *C08K 3/36* | (2006.01) | |

(52) U.S. Cl.
CPC ............. *C01B 33/193* (2013.01); *B01J 21/08* (2013.01); *B01J 35/1014* (2013.01); *B01J 35/1019* (2013.01); *C08K 3/36* (2013.01); *C01P 2002/54* (2013.01); *C01P 2004/51* (2013.01); *C01P 2006/12* (2013.01); *C01P 2006/16* (2013.01); *C08K 2201/005* (2013.01); *C08K 2201/006* (2013.01)

(58) Field of Classification Search
CPC ..... C01B 33/00; C01B 33/128; C01B 33/193; C01B 33/12; C01B 33/26; C01B 33/2807; C01B 33/283; C01P 2004/51; C01P 2004/62; C01P 2006/12; C01P 2006/16; C01P 2006/00; C01P 2002/54; B01J 35/1014; B01J 35/1019; B01J 21/08; C08K 2201/005; C08K 2201/006; C08K 3/36

See application file for complete search history.

(56) References Cited

U.S. PATENT DOCUMENTS

| | | | |
|---|---|---|---|
| 2002/0061404 A1 | 5/2002 | Schubert et al. | |
| 2003/0066459 A1 | 4/2003 | Bomal et al. | |
| 2006/0093541 A1 | 5/2006 | Uhrlandt et al. | |
| 2011/0263784 A1* | 10/2011 | Valero et al. | ......... C01B 33/193 423/339 |
| 2013/0156674 A1 | 6/2013 | Guy et al. | |
| 2013/0178569 A1* | 7/2013 | Guy et al. | ................ C08K 3/36 106/483 |
| 2017/0015807 A1* | 1/2017 | Boivin et al. | ............ C08K 3/36 |
| 2017/0058111 A1* | 3/2017 | Boivin et al. | ......... C01B 33/193 |
| 2017/0073238 A1* | 3/2017 | Guy et al. | ............. C01B 33/193 |

FOREIGN PATENT DOCUMENTS

| | | | |
|---|---|---|---|
| EP | 1193220 A1 | 4/2002 | |
| WO | 9630304 A1 | 10/1996 | |
| WO | 03016215 A1 | 2/2003 | |
| WO | 03106339 A1 | 12/2003 | |
| WO | 2011117400 A1 | 9/2011 | |
| WO | WO-2011117400 A1 * | 9/2011 | ........... C01B 33/187 |

OTHER PUBLICATIONS

Machine translation of WO2011117400-Valero, published Sep. 29, 2011 (Year: 2011).*
Methylbutynol, a new and simple diagnostic tool for acidic and basic sites of solids. Lauron-Pernot, Rhone Poulenc, Aubervilliers, France / Elsevier, Applied catalysts, 1991, vol. 78, p. 213.

* cited by examiner

*Primary Examiner* — Smita S Patel
(74) *Attorney, Agent, or Firm* — Osha Bergman Watanabe & Burton LLP

(57) ABSTRACT

A precipitated silica having a broad particle size distribution and large median particle size as well as its method of manufacture is provided. The precipitated silica has a CTAB surface area $S_{CTAB}$ in the range from 40 to 300 m²/g, a difference between BET surface area $S_{BET}$ and CTAB surface area $S_{CTAB}$ of at least 35 m²/g, a width of the particle size distribution Ld, measured by centrifugal sedimentation, of at least 1.5, an amount of aluminium $W_{Al}$ in the range from 0.5 to 7.0 wt %, and a median particle size d50, measured by centrifugal sedimentation, such that for a given value of CTAB surface area $S_{CTAB}$ and amount of aluminium $W_{Al}$, parameter A, defined by the following equation: $A=|d50|+0.782\times|S_{CTAB}|-8.524\times|W_{Al}|$.

27 Claims, No Drawings

PRECIPITATED SILICA AND PROCESS FOR ITS MANUFACTURE

This application is a U.S. national stage entry under 35 U.S.C. § 371 of International Application No. PCT/EP2018/061302 filed May 3, 2018, which claims priority to European application No. EP 17305510.4 filed on May 5, 2017, the whole content of these applications being incorporated herein by reference for all purposes.

PARTIES TO A JOINT RESEARCH AGREEMENT

The presently claimed invention was made by or on behalf of the below listed parties to a joint research agreement. The joint research agreement was in effect on or before the date the claimed invention was made, and the claimed invention was part of the joint research agreement and made as a result of activities undertaken within the scope of the joint research agreement. The parties to the joint research agreement are Rhodia Operations and Compagnie Generale des Etablissements Michelin.

TECHNICAL FIELD

The present invention relates to precipitated silica and to a process for its manufacture. The invention further relates to the use of precipitated silica as reinforcing filler in polymeric compositions or as catalyst or catalyst support.

BACKGROUND ART

The use of precipitated silica as a reinforcing filler in polymeric compositions is known. In particular it is known to use precipitated silica as reinforcing filler in elastomeric compositions. Such use is highly demanding: the filler has to readily and efficiently incorporate and disperse in the elastomeric composition and, typically in conjunction with a coupling reagent, enter into a chemical bond with the elastomer(s), to lead to a high and homogeneous reinforcement of the elastomeric composition. In general, precipitated silica is used in order to improve the mechanical properties of the elastomeric composition as well as handling and abrasion performance.

There is therefore always a need for novel precipitated silica for use as reinforcing filler in polymeric compositions which provides for an optimal balance among all of the above-mentioned requirements.

In particular there is always the need of precipitated silica capable to provide a balance between conflicting properties such as abrasion resistance and/or polymer reinforcement on one hand and reduced energy dissipation properties, which in turn provide for reduced heat build-up, on the other.

SUMMARY OF INVENTION

A first objective of the present invention is to provide novel precipitated silica which can be incorporated efficiently into polymeric compositions and exhibits improved balance of performance properties. A second objective of the invention is a process for the manufacture of the precipitated silica.

A further objective of the invention is to provide elastomeric compositions comprising the precipitated silica as reinforcing filler.

It has been found, that surprisingly, these objectives are achieved by the inventive precipitated silica defined in detail in the description which follows and in the claims and the examples.

It has been found that good mechanical properties and/or reduced energy dissipation (hence heat build-up) in elastomeric compositions can be obtained by the use of a precipitated silica characterised by:
- a CTAB surface area $S_{CTAB}$ in the range from 40 to 300 $m^2/g$;
- a difference between the BET surface area $S_{BET}$ and the CTAB surface area $S_{CTAB}$ of at least 35 $m^2/g$;
- a width of the particle size distribution Ld, measured by centrifugal sedimentation, of at least 1.5;
- an amount of aluminium $W_{Al}$ in the range from 0.5 to 7.0 wt %; and
- a median particle size d50, measured by centrifugal sedimentation, such that for a given value of CTAB surface area $S_{CTAB}$ and amount of aluminium $W_{Al}$, parameter A defined by equation (I):

$$A = |d50| + 0.782 \times |S_{CTAB}| - 8.524 \times |W_{Al}| \quad (I)$$

satisfies relationship (II):

$$A \geq 253 \quad (II)$$

wherein:
|d50| represents the numerical value of the median particle size d50 measured by centrifugal sedimentation and expressed in nm; $|S_{CTAB}|$ represents the numerical value of the CTAB surface area $S_{CTAB}$ expressed in $m^2/g$; and $|W_{Al}|$ represents the numerical value of the percentage amount of aluminium $W_{Al}$.

Precipitated silica containing aluminium has been previously described, for instance in WO96/30304 A1, WO03/106339 A1, EP1193220 A1 and WO2011/117400 A1. None of these documents however discloses a precipitated silica having, for a given value of CTAB surface area, the broad particle size distribution Ld and/or a median particle size d50 (meant as the size of the silica aggregates) such that parameter A satisfies relationship (II), as the precipitated silica of the invention.

WO96/30304 A1 discloses precipitated silica characterised by a CTAB specific surface area of 140-200 $m^2/g$, a BET specific surface area of 140-200 $m^2/g$, a mean diameter measured by laser diffraction after ultrasonic disintegration of less than 3 µm and an aluminium content of at least 0.35 wt %. WO2011/117400 A1 disclose a process for the preparation of aluminium-containing precipitated silica. The precipitated silica obtained from the process have an aluminium content of at least 0.5 wt % and a mean diameter measured by laser diffraction after ultrasonic disintegration of less than 5 µm. None of these two prior art documents disclose the particle size of the silica aggregates measured by means of centrifugal sedimentation in a disc centrifuge nor the breadth of the particle size distribution.

EP1193220 A1 discloses an aluminium-containing precipitated silica having a BET specific surface area greater than 300 $m^2/g$. The amount of aluminium (measured as amount of $Al_2O_3$) is from 0.05 to 0.5 wt % and the size of the silica particles is less than 15 µm, preferably between 5 and 12 µm. The method for the determination of the silica particle size is not described.

WO03/106339 A1 discloses an aluminium-containing precipitated silica having an adjustable BET/CTAB ratio. Neither the value of the median particle size of the silica aggregates measured by means of centrifugal sedimentation in a disc centrifuge nor the breadth of the particle size distribution are disclosed.

DESCRIPTION OF INVENTION

The precipitated silica of the invention is characterised by:
- a CTAB surface area $S_{CTAB}$ in the range from 40 to 300 m²/g;
- a difference between the BET surface area $S_{BET}$ and the CTAB surface area $S_{CTAB}$ of at least 35 m²/g;
- a width of the particle size distribution Ld, measured by centrifugal sedimentation, of at least 1.5;
- an amount of aluminium $W_{Al}$ in the range from 0.5 to 7.0 wt %; and
- a median particle size d50, measured by centrifugal sedimentation, such that for a given value of CTAB surface area $S_{CTAB}$ and amount of aluminium $W_{Al}$, parameter A defined by equation (I):

$$A = |d50| + 0.782 \times |S_{CTAB}| - 8.524 \times |W_{Al}| \qquad (I)$$

satisfies relationship (II):

$$A \geq 253 \qquad (II)$$

wherein:
|d50| represents the numerical value of the median particle size d50 measured by centrifugal sedimentation and expressed in nm; $|S_{CTAB}|$ represents the numerical value of the CTAB surface area $S_{CTAB}$ expressed in m²/g; and $|W_{Al}|$ represents the numerical value of the percentage amount of aluminium $W_{Al}$.

In the present specification, the terms "silica" and "precipitated silica" are used as synonyms.

In the present specification numerical ranges defined by the expression "between a and b" indicate a numerical range which excludes end values a and b. Numerical ranges defined by the expression "from a to b" indicate a numerical range which includes end values a and b.

Numerical ranges defined by the expression "a is at least b" indicate ranges wherein a is equal to or greater than b.

For the avoidance of doubts, the symbol "x" in equation (I) represents the multiplication sign, such that the expression "a×b" means a multiplied by b.

The CTAB surface area $S_{CTAB}$ is a measure of the external specific surface area as determined by measuring the quantity of N hexadecyl-N,N,N-trimethylammonium bromide adsorbed on the silica surface at a given pH. The CTAB surface area $S_{CTAB}$ is at least 40 m²/g, typically at least 60 m²/g. The CTAB surface area $S_{CTAB}$ may be greater than 70 m²/g. The CTAB surface area $S_{CTAB}$ may even be greater than 110 m²/g, greater than 120 m²/g, possibly even greater than 130 m²/g.

The CTAB surface area does not exceed 300 m²/g, typically 280 m²/g. The CTAB surface area $S_{CTAB}$ may be lower than 280 m²/g, even lower than 270 m²/g.

For elastomer reinforcement applications advantageous ranges of CTAB surface area $S_{CTAB}$ are: from 70 to 300 m²/g, from 80 to 300 m²/g, preferably from 110 to 300 m²/g, from 120 to 300 m²/g, from 140 to 300 m²/g, even from 145 to 300 m²/g, preferably from 150 to 300 m²/g, more preferably from 160 to 300 m²/g, and still from 160 to 280 m²/g, from 130 to 280 m²/g.

The difference between the BET surface area $S_{BET}$ and the CTAB surface area $S_{CTAB}$ ($S_{BET}-S_{CTAB}$) is generally taken as representative of the microporosity of the precipitated silica in that it provides a measure of the pores of the silica which are accessible to nitrogen molecules but not to larger molecules, like N hexadecyl-N,N,N-trimethylammonium bromide.

The precipitated silica of the invention is characterised by a difference ($S_{BET}-S_{CTAB}$) of at least 35 m²/g. The difference ($S_{BET}-S_{CTAB}$) is preferably at least 40 m²/g, at least 45 m²/g, at least 50 m²/g, at least 55 m²/g, even at least 60 m²/g. Values of the difference ($S_{BET}-S_{CTAB}$) are not limited. In general the difference ($S_{BET}-S_{CTAB}$) may be less than 150 m²/g, typically less than 100 m²/g. The difference ($S_{BET}-S_{CTAB}$) does not generally exceed 300 m²/g.

Advantageously, the precipitated silica of the invention is characterised by a difference ($S_{BET}-S_{CTAB}$) in the range from 50 to 300 m²/g, typically in the range from 55 to 150 m²/g.

The BET surface area $S_{BET}$ of the inventive silica is not particularly limited but it is at least 35 m²/g higher than CTAB surface area $S_{CTAB}$. BET surface area $S_{BET}$ is generally at least 80 m²/g, at least 100 m²/g, at least 140 m²/g, at least 160 m²/g, even at least 170 m²/g, at least 180 m²/g, and even at least 200 m²/g. The BET surface area $S_{BET}$ can be as high as 400 m²/g, even as high as 450 m²/g.

The inventive silica may have the following combinations of CTAB surface area $S_{CTAB}$ and BET surface area $S_{BET}$:
$S_{CTAB}$ from 70 to 300 m²/g and $S_{BET}$ from 110 to 450 m²/g;
$S_{CTAB}$ from 110 to 300 m²/g and $S_{BET}$ from 160 to 450 m²/g;
$S_{CTAB}$ from 110 to 300 m²/g and $S_{BET}$ from 180 to 450 m²/g;
$S_{CTAB}$ from 120 to 300 m²/g and $S_{BET}$ from 200 to 450 m²/g.

The inventive silica contains aluminium. Aluminium is present in an amount $W_{Al}$ in the range from 0.5 to 7.0 wt %, typically from 0.5 to 5.0 wt %. Throughout the present text the amount of aluminium, $W_{Al}$, is defined as the percentage amount by weight of aluminium, meant as aluminium metal, with respect to the weight of silica.

$W_{Al}$ is preferably equal to or greater than 0.8 wt %, even equal to or greater than 1.0 wt %. Advantageously, $W_{Al}$ is from 0.8 to 3.5 wt %, even from 1.0 to 3.0 wt %.

It has to be understood that the inventive silica may contain other elements in addition to aluminium, notable, non-limiting examples are for instance Mg, Ca or Zn.

The precipitated silica of the invention is further characterised by a broad particle size distribution. The term "particle" is used herein to refer to aggregates of primary silica particles. The term particle is used to refer to the smallest aggregate of primary silica particles that can be broken by mechanical action. In other words, the term particle refers to an assembly of indivisible primary particles.

Parameter Ld, determined by means of centrifugal sedimentation in a disc centrifuge as detailed hereafter, is used to characterize the width of the particle size distribution. Ld is defined as follows:

$$Ld = (d84 - d16)/d50$$

wherein dn is the particle diameter below which one finds n % of the total measured mass. Ld is an adimensional number. The width of the particle size distribution Ld is calculated on the cumulative particle size curve. As an example, d50 represents the particle diameter below (and above) which 50% of the total mass of particles is found. Thus, d50 represents the median particle size of a given distribution, wherein the term "size" in this context has to be intended as "diameter".

It has been found that, when compared to a precipitated silica having the same surface area, the inventive silica has a broader particle size distribution which allows to obtain elastomeric compositions having reduced energy dissipation properties (hence reduced heat build-up) and a good level of reinforcement.

The width of the particle size distribution Ld is at least 1.5, typically at least 1.6. The width of the particle size distribution Ld no more than 4.0, typically no more than 3.5.

Advantageously, the width of the particle size distribution Ld of the inventive silica is in the range from 1.5 to 3.5, even in the range from 1.5 to 3.2. The width of the particle size distribution Ld of the inventive silica can be in the range from 1.5 to 3.0, preferably from 1.5 to 2.5.

An important feature of the inventive silica is the large median particle size (particle diameter) d50 for a given $S_{CTAB}$ value. It is known that particle size and surface area are inversely related the one to the other: surface area increases when the size of the particles decreases.

In particular, it has been found that the median particle size of the inventive silica, at given aluminium content and CTAB surface area $S_{CTAB}$, is significantly higher than value measured on precipitated silicas of the prior art containing aluminium.

It has been found that the median particle size d50, the amount of aluminium $W_{Al}$ and the CTAB surface area $S_{CTAB}$ of the inventive silica are such that parameter A defined by equation (I):

$$A = |d50| + 0.782 \times |S_{CTAB}| - 8.524 \times |W_{Al}| \quad (I)$$

satisfies relationship (II):

$$A \geq 253 \quad (II).$$

In equation (I), |d50| represents the numerical value of the median particle size d50 measured by measured by centrifugal sedimentation and expressed in nm. |d50| is an adimensional number. As an example if the value of d50 measured by centrifugal sedimentation is 100 nm, |d50| is 100.

In equation (I), $|S_{CTAB}|$ represents the numerical value of the CTAB surface area $S_{CTAB}$ expressed in m$^2$/g. $|S_{CTAB}|$ is an adimensional number. As an example if the measured value of $S_{CTAB}$ is 200 m$^2$/g, $|S_{CTAB}|$ is 200.

In equation (I), $|W_{Al}|$ represents the numerical value of the percentage amount of aluminium $W_{Al}$. $|W_{Al}|$ is an adimensional number. As an example if the amount of aluminium by weight with respect to the weight of silica is 1.3%, then $|W_{Al}|$ is 1.3.

Parameter A is an adimensional number which for the inventive silica is equal to or greater than 253. Parameter A typically does not exceed 300. Suitable values of parameter A in relationship (II) are: A≥253, A≥255, A≥258, A≥259, A≥260. Suitable ranges for parameter A may be: 253≤A≤298, 255≤A≤297, 255≤A≤288, 258≤A≤285, or even 259≤A≤285.

In the CTAB surface area $S_{CTAB}$ range from 40 to 300 m$^2$/g, the inventive silica is characterised by a median particle size d50 which is generally greater than 30 nm.

When $W_{Al}$ is in the range from 0.8 to 3.0 wt % and the CTAB surface area $S_{CTAB}$ is in the range from 70 to 280 m$^2$/g typical values of the median particle size d50 are generally equal to or greater than 65 nm, equal to or greater than 70 nm, even equal to or greater than 80 nm.

The d50 value of the inventive silica typically does not exceed 320 nm, more typically it does not exceed 300 nm.

In an advantageous embodiment, the precipitated silica of the invention is characterised by:
- a CTAB surface area $S_{CTAB}$ in the range from 40 to 300 m$^2$/g;
- a difference ($S_{BET}-S_{CTAB}$) of at least 35 m$^2$/g;
- an amount of aluminium ($W_{Al}$) in the range from 0.5 to 5.0 wt %;
- width of the particle size distribution Ld of at least 1.5; and
- a median particle size d50 such that:

$$A = |d50| + 0.782 \times |S_{CTAB}| - 8.524 \times |W_{Al}| \quad (I)$$

and $$A \geq 255 \quad (II).$$

In another advantageous embodiment the precipitated silica of the invention is characterised by:
- a CTAB surface area $S_{CTAB}$ in the range from 70 to 300 m$^2$/g;
- a difference ($S_{BET}-S_{CTAB}$) of at least 50 m$^2$/g;
- an amount of aluminium ($W_{Al}$) in the range from 0.5 to 5.0 wt %;
- width of the particle size distribution Ld between 1.5 and 3.5; and
- a median particle size d50 such that:

$$A = |d50| + 0.782 \times |S_{CTAB}| - 8.524 \times |W_{Al}| \quad (I)$$

and $$A \geq 255 \quad (II).$$

In a further advantageous embodiment the precipitated silica of the invention is characterised by:
- a $S_{CTAB}$ surface area in the range from 110 to 300 m$^2$/g;
- a difference ($S_{BET}-S_{CTAB}$) of at least 50 m$^2$/g;
- an amount of aluminium ($W_{Al}$) in the range from 0.8 to 5.0 wt %;
- a width of the particle size distribution Ld between 1.5 and 3.5; and
- a median particle size d50 such that:

$$A = |d50| + 0.782 \times |S_{CTAB}| - 8.524 \times |W_{Al}| \quad (I)$$

and $$259 \leq A \leq 300 \quad (II).$$

In a still further advantageous embodiment the precipitated silica of the invention is characterised by:
- a CTAB surface area $S_{CTAB}$ in the range from 110 to 300 m$^2$/g;
- a difference ($S_{BET}-S_{CTAB}$) of at least 50 m$^2$/g;
- an amount of aluminium ($W_{Al}$) in the range from 0.8 to 3.0 wt %;
- a width of the particle size distribution Ld between 1.5 and 2.5; and
- a median particle size d50 such that:

$$A = |d50| + 0.782 \times |S_{CTAB}| - 8.524 \times |W_{Al}| \quad (I)$$

and $$259 \leq A \leq 300 \quad (II).$$

In an another embodiment the precipitated silica of the invention is characterised by:
- a CTAB surface area $S_{CTAB}$ in the range from 110 to 300 m$^2$/g;
- a BET surface area $S_{BET}$ in the range from 180 to 450 m$^2$/g
- a difference ($S_{BET}-S_{CTAB}$) of at least 50 m$^2$/g;
- an amount of aluminium ($W_{Al}$) in the range from 0.8 to 3.0 wt %;
- a width of the particle size distribution Ld between 1.5 and 3.5; and a median particle size d50 such that:

$$A = |d50| + 0.782 \times |S_{CTAB}| - 8.524 \times |W_{Al}| \quad (I)$$

and $$A \geq 253 \quad (II).$$

It is known that for precipitated silica the pore size and surface area are inversely related the one to the other: pore size increases when surface area decreases. The so-called "Mode" of pore volume distribution measured by mercury porosimetry can be taken as a measure of the average size of the pores. The Mode is the most populated pore size in terms of volume in the area of aggregate size. gives a frequency curve, The Mode is defined as the abscissa of the maximum of the derivative of the cumulative pore volume curve (mL/g) as a function of the pore radius (nm) for pores with radii of less than 100 nm. The Mode is the abscissa of the main pore diameter population and is typically expressed in nm. When compared to known precipitated silica containing aluminium, the inventive silica is generally characterized by a larger Mode, that is by a larger average size of pores.

A second object of the present invention is a process for preparing the precipitated silica of the first object, said process comprising:
(i) providing a starting solution having a pH from 2.00 to 5.00,
(ii) simultaneously adding a silicate and an acid to said starting solution such that the pH of the reaction medium is maintained in the range from 2.00 to 5.00,
(iii) stopping the addition of the acid and of the silicate and adding a base to the reaction medium to raise the pH of said reaction medium to a value from 7.00 to 10.00,
(iv) simultaneously adding to the reaction medium at least one compound of aluminium, a silicate and an acid, such that the pH of the reaction medium is maintained in the range from 7.00 to 10.00,
(v) stopping the addition of the silicate and of the at least one compound of aluminium while continuing the addition of the acid to the reaction medium to reach a pH of the reaction medium of less than 6.00 and obtaining a suspension of precipitated silica.

The term "base" is used herein to refer to one or more than one base which can be added during the course of the inventive process and it includes the group consisting of silicates as defined hereafter. Any base may be used in the process. In addition to silicates, notable non-limiting examples of suitable bases are for instance alkali metal hydroxides and ammonia.

The term "silicate" is used herein to refer to one or more than one silicate which can be added during the course of the inventive process. The silicate is typically selected from the group consisting of the alkali metal silicates. The silicate is advantageously selected from the group consisting of sodium and potassium silicate. The silicate may be in any known form, such as metasilicate or disilicate.

In the case where sodium silicate is used, the latter generally has an $SiO_2/Na_2O$ weight ratio of from 2.0 to 4.0, in particular from 2.4 to 3.9, for example from 3.1 to 3.8.

The silicate may have a concentration (expressed in terms of $SiO_2$) of from 3.9 wt % to 25.0 wt %, for example from 5.6 wt % to 23.0 wt %, in particular from 5.6 wt % to 20.7 wt %.

The term "acid" is used herein to refer to one or more than one acid which can be added during the course of the inventive process. Any acid may be used in the process. Use is generally made of a mineral acid, such as sulfuric acid, nitric acid, phosphoric acid or hydrochloric acid, or of an organic acid, such as carboxylic acids, e.g. acetic acid, formic acid or carbonic acid.

The acid may be metered into the reaction medium in diluted or concentrated form. The same acid at different concentrations may be used in different stages of the process. Preferably the acid is sulfuric acid.

In a preferred embodiment of the process sulfuric acid and sodium silicate are used in all of the stages of the process. Preferably, the same sodium silicate, that is sodium silicate having the same concentration expressed as $SiO_2$, is used in all of the stages of the process.

In step (i) of the process a starting solution having a pH from 2.00 to 5.00 is provided in the reaction vessel. The starting solution is an aqueous solution, the term "aqueous" indicating that the solvent is water.

Preferably, the starting solution has a pH from 2.50 to 5.00, especially from 3.00 to 4.50; for example, from 3.50 to 4.50.

The starting solution may be obtained by adding an acid to water so as to obtain a pH value as detailed above.

Alternatively, the starting solution may contain a silicate. In such a case it may be obtained by adding acid to a mixture of water and silicate to obtain a pH from 2.00 to 5.00.

The starting solution may also be prepared by adding acid to a solution containing preformed silica particles at a pH below 7.00, so as to obtain a pH value from 2.00 to 5.00, preferably from 2.50 to 5.00, especially from 3.00 to 4.50, for example from 3.50 to 4.50.

The starting solution of step (i) may or may not comprise an electrolyte. Preferably, the starting solution of step (i) contains an electrolyte.

The term "electrolyte" is used herein in its generally accepted meaning, i.e. to identify any ionic or molecular substance which, when in solution, decomposes or dissociates to form ions or charged particles. The term "electrolyte" is used herein to indicate one or more than one electrolyte may be present. Mention may be made of electrolytes such as the salts of alkali metals and alkaline-earth metals. Advantageously, the electrolyte for use in the starting solution is the salt of the metal of the starting silicate and of the acid used in the process. Notable examples are for example sodium chloride, in the case of the reaction of a sodium silicate with hydrochloric acid or, preferably, sodium sulfate, in the case of the reaction of a sodium silicate with sulfuric acid. The electrolyte does not contain aluminium.

Preferably, when sodium sulfate is used as electrolyte in step (i), its concentration in the starting solution is from 8 to 40 g/L, especially from 10 to 35 g/L, for example from 13 to 30 g/L.

Step (ii) of the process comprises a simultaneous addition of an acid and of a silicate to the starting solution. The rates of addition of the acid and of the silicate during step (ii) are controlled in such a way that the pH of the reaction medium is maintained in the range from 2.00 to 5.00. The pH of the reaction medium is preferably maintained in the range from 2.50 to 5.00, especially from 3.00 to 5.00, for example from 3.20 to 4.80.

The simultaneous addition in step (ii) is advantageously performed in such a manner that the pH value of the reaction medium is always equal (to within ±0.20 pH units) to the pH reached at the end of step (i).

Preferably, step (ii) consists of a simultaneous addition of acid and silicate as detailed above.

In one embodiment of the inventive process, an intermediate step (ii') may be carried out between step (i) and step (ii), wherein a silicate and an acid are added to the starting solution such that the pH of the reaction medium is maintained in the range from 2.00 to 9.50. The addition of silicate and acid can be simultaneous for all or for only a part of step (ii'). Step (ii') is typically protracted for 1 to 10 minutes, preferable for 2 to 8 minutes before step (ii) is initiated.

Next, in step (iii), the addition of the acid and of the silicate is stopped and a base is added to the reaction medium. The addition of the base is stopped when the pH of the reaction medium has reached a value of from 7.00 to 10.00, preferably from 7.50 to 9.50.

In a first embodiment of the process the base is a silicate. Thus, in step (iii), the addition of the acid is stopped while the addition of the silicate to the reaction medium is continued until a pH of from 7.00 to 10.00, preferably from 7.50 to 9.50, is reached.

In a second embodiment of the process the base is different from a silicate and it is selected from the group consisting of the alkali metal hydroxides, preferably sodium or potassium hydroxide. When sodium silicate is used in the process a preferred base may be sodium hydroxide.

Thus, in this second embodiment of the process, in step (iii), the addition of the acid and of the silicate is stopped and a base, different from a silicate, is added to the reaction medium until a pH of from 7.00 to 10.00, preferably from 7.50 to 9.50, is reached.

At the end of step (iii), that is after stopping the addition of the base, it may be advantageous to perform a maturing step of the reaction medium. This step is preferably carried out at the pH obtained at the end of step (iii). The maturing step may be carried out while stirring the reaction medium. The maturing step is preferably carried out under stirring of the reaction medium over a period of 2 to 45 minutes, in particular from 5 to 25 minutes. Preferably the maturing step does not comprise any addition of acid or silicate.

After step (iii) and the optional maturing step, a simultaneous addition of at least one compound of aluminium, of an acid and of a silicate is performed, such that the pH of the reaction medium is maintained in the range from 7.00 to 10.00, preferably from 7.50 to 9.50.

The simultaneous addition of at least one compound of aluminium, of an acid and of a silicate (step (iv)) is typically performed in such a manner that the pH value of the reaction medium is maintained equal to the pH reached at the end of the preceding step (to within ±0.20 pH units), step (iii).

It should be noted that the inventive process may comprise additional steps. For example, between step (iii) and step (iv), and in particular between the optional maturing step following step (iii) and step (iv), an acid can be added to the reaction medium. The pH of the reaction medium after this addition of acid should remain in the range from 7.00 to 9.50, preferably from 7.50 to 9.50.

In step (v), the addition of the silicate and of the at least one compound of aluminium is stopped while continuing the addition of the acid to the reaction medium so as to obtain a pH value in the reaction medium of less than 6.00, preferably from 3.00 to 5.50, in particular from 3.00 to 5.00. A suspension of precipitated silica is obtained in the reaction vessel.

At the end of step (v), and thus after stopping the addition of the acid to the reaction medium, a maturing step may advantageously be carried out. This maturing step may be carried out at the same pH obtained at the end of step (v) and under the same time conditions as those described above for the maturing step which may be optionally carried out between step (iii) and (iv) of the process.

At least one compound of aluminium is metered into the reaction medium during step (iv), that is during the simultaneous addition of an acid and of a silicate to the reaction medium at a pH in the range from 7.00 to 10.00. The least one aluminium compound may be metered to the reaction medium over the whole duration of step (iv), that is at the same time as the addition of acid and silicate. Alternatively, it may be metered during only one part of step (iv), for instance only after a first simultaneous addition of acid and silicate has taken place. The at least one compound of aluminium is typically added into the reaction medium in the form of a solution, typically an aqueous solution. All of the at least one compound of aluminium is added during step (iv).

The expression "at least one compound of aluminium" is used to refer to one or more than one aluminium compound which can be added during the course of the inventive process.

Any compound of aluminium may be used in the process of the invention provided it is soluble in water. Notable examples of suitable compounds include but are not limited to aluminium chlorides, sulfates or nitrates or alkaline metal aluminates. The compound is generally selected from the group consisting of the alkali metal aluminates, in particular potassium aluminate or, preferably, sodium aluminate. The at least one compound of aluminium is generally added to the reaction medium in the form of a solution, typically an aqueous solution.

The reaction vessel in which the entire reaction of the silicate with the acid is performed is usually equipped with adequate stirring and heating equipment.

The entire reaction of the silicate with the acid (steps (i) to (v)) is generally performed at a temperature from 40 to 97° C., in particular from 60 to 95° C., preferably from 80 to 95° C., more preferably from 85 to 95° C.

According to one variant of the invention, the entire reaction of the silicate with the acid is performed at a constant temperature, usually of from 40 to 97° C., in particular from 80 to 95° C., and even from 85 to 95° C.

According to another variant of the invention, the temperature at the end of the reaction is higher than the temperature at the start of the reaction: thus, the temperature at the start of the reaction (for example during steps (i) to (iii)) is preferably maintained in the range from 40 to 85° C. and the temperature is then increased, preferably up to a value in the range from 80 to 95° C., even from 85 to 95° C., at which value it is maintained (for example during steps (iv) and (v)), up to the end of the reaction.

It has been found that the succession of particular steps, in particular the presence of a first simultaneous addition of acid and silicate at a pH from 2.00 and 5.00 and of a simultaneous addition of a compound of aluminium, acid and silicate at a pH from 7.00 to 10.00, constitute important conditions for obtaining a precipitated silica having the claimed features and in particular the large width of the particle size distribution and the high median particle size d50. The different parameters of the process, e.g. temperature, pH of the reaction medium, amount of electrolyte present in step (i), amount of the compound of aluminium, can be varied to obtain precipitated silica having the required value of CTAB specific surface $S_{CTAB}$, BET specific surface $S_{BET}$ and amount of aluminium $W_{Al}$.

At the end of the steps that have just been described, a suspension of precipitated silica is obtained, which is subsequently separated (liquid/solid separation). The process typically comprises a further step (vi) of filtering the suspension and drying the precipitated silica.

The separation performed in the preparation process according to the invention usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Alternatively, the liquefaction step may be carried out by subjecting the filter cake to a chemical action by addition for instance of an acid or an aluminum compound, for example sodium aluminate. Still alternatively, the liquefaction step may comprises both a mechanical treatment and a chemical action.

When an aluminum compound is added to the filter cake during the liquefaction operation the amount is generally such that the ratio of aluminum compound to amount of silica, expressed as $SiO_2$, present in the filter cake is from 0.10% to 0.75%, preferably from 0.10% to 0.50% by weight, more preferably from 0.20% to 0.45% by weight.

Regardless of the stage of addition of an aluminium compound, the cumulative amount of said compound metered into the reaction medium is such that the amount of aluminium in the precipitated silica is in the range from 0.5 to 7.0 wt %. The rates of addition of the aluminium compound can be adapted to obtain the desired content of aluminium in the precipitated silica by means known to the person skilled in the art.

The suspension of precipitated silica which is obtained after the liquefaction step is subsequently preferably dried.

This drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The inventive precipitated silica can be used in a number of applications, such as absorbent for active materials (in particular support for liquids, especially used in food, such as vitamins (vitamin E or choline chloride)), as viscosity modifier, texturizing or anticaking agent, or as additive for toothpaste, concrete or paper.

The inventive silica may be used as catalyst or as catalyst support. An object of the invention is thus a catalyst or a catalyst support comprising, even consisting of, the inventive precipitated silica.

The inventive silica may also conveniently be used in the manufacture of thermally insulating materials or in the preparation of resorcinol-formaldehyde/silica composites.

The inventive precipitated silica finds a particularly advantageous application as filler in polymeric compositions.

Accordingly, a further object of the invention is a composition comprising the inventive silica as above defined and at least one polymer. The phrase "at least one" when referred to the polymer in the composition is used herein to indicate that one or more than one polymer of each type can be present in the composition.

The expression "copolymer" is used herein to refer to polymers comprising recurring units deriving from at least two monomeric units of different nature.

The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers, preferably exhibiting at least one glass transition temperature between −150° C. and +300° C., for example between −150° C. and +20° C.

Notable non-limiting examples of suitable elastomers are diene elastomers. For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymer, propylene homo- and copolymer.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Non-limiting examples of suitable coupling agents are for instance "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis (3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

The silica of the invention can optionally be combined with at least one other reinforcing filler, for instance a highly dispersible silica, such as Zeosil® 1165MP, Zeosil® 1115MP or Zeosil® 1085 GR (commercially available from Solvay), or another reinforcing inorganic filler, such as nanoclays, alumina. Alternatively, the silica of the invention may be combined with an organic reinforcing filler, such as carbon black nanotubes, graphene and the like.

The silica according to the invention then preferably constitutes at least 50% by weight, indeed even at least 80% by weight, of the total amount of the reinforcing filler.

The inventive silica is characterized by a marked ability to disperse in elastomeric compositions. A known method to determine the ability of a filler to disperse in an elastomeric matrix is described in S. Otto et al. in Kautschuk Gummi Kunststoffe, 58 Jahrgang, NR 7-8/2005. The method, described in more details hereafter, relies on optical analysis and defines the dispersion of the filler in the elastomeric matrix in terms of a Z value which is proportional to the amount of undispersed filler in a matrix, with 100 indicating a perfect mix and 0 a poor mix.

The inventive silica, when dispersed in an elastomeric matrix, is characterised by a Z value which is typically higher than that of comparable mixtures containing prior art silica.

The compositions comprising the precipitated silica of the invention may be used for the manufacture of a number of articles. Non-limiting examples of finished articles comprising at least one of the polymer compositions described above, are for instance of footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, or transmission belts.

Should the disclosure of any patents, patent applications, and publications which are incorporated herein by reference conflict with the description of the present application to the extent that it may render a term unclear, the present description shall take precedence.

Analytical Methods

The physicochemical properties of the precipitated silica of the invention were determined using the methods described hereafter.

Determination of CTAB Surface Area

CTAB surface area ($S_{CTAB}$) values were determined according to an internal method derived from standard NF ISO 5794-1, Appendix G. The method was based on the adsorption of CTAB (N hexadecyl-N,N,N-trimethylammonium bromide) on the "external" surface of the silica.

In the method, CTAB was allowed to adsorb on silica under magnetic stirring. Silica and residual CTAB solution were then separated. Excess, unadsorbed CTAB, was determined by back-titration with bis(2-ethylhexyl)sulfosuccinate sodium salt (hereinafter "AOT") using a titroprocessor, the endpoint being given by the turbidity maximum of the solution and determined using an optrode.

Equipment

Metrohm Optrode (Wavelength: 520 nm) connected to photometer 662 Metrohm; Metrohm Titrator: Titrino DMS 716; Metrohm titration software: Tiamo.

Glass beaker (2000 mL); volumetric flasks (2000 mL); sealed glass bottles (1000 and 2000 mL); disposable beakers (100 mL); micropipette (500-5000 μL); magnetic stirring bars with 25 mm discs ends (Ref VWR 442-9431) for adsorption; magnetic stirring bars (straight) for titration; polycarbonate centrifugation tubes (at least 20 mL), centrifuge (allowing a 10000 rpm speed); glass vials (30 mL); thermobalance.

Preparation of the Solutions

Preparation of CTAB solution at 5.5 g/L (buffered at about pH 9.6): in a 2000 mL beaker containing about 1000 mL of distilled water at 25° C. were added: 54.25 g of boric acid solution ([c]=4%); 2.60 g of KCl, 25.8 mL (±0.1 mL) of sodium hydroxide. The so-obtained solution was stirred for 15 min before adding 11.00 g±0.01 g of CTAB powder (99.9% purity, purchased from Merck). After stirring, the solution was transferred to a 2000 mL volumetric flask kept at 25° C. and the volume brought at 2000 mL with distilled water. The solution was transferred in a 2000 mL glass bottle. The solution was kept at a temperature not lower than 22° C. to avoid CTAB crystallization (occurring at 20° C.).

Preparation of AOT solution: about 1200 mL of distilled water in a 2000 mL beaker were heated to 35° C. under magnetic stirring. 3.7038 g of AOT (98% purity, purchased from Aldrich) were added. The solution was transferred to a 2000 mL volumetric flask and allowed to cool back to 25° C. The volume was brought to 2000 mL with distilled water and the solution was transferred in two glass bottles of 1000 mL which were stored at 25° C. in a dark place.

All equipment and solutions were kept at 25° C. during analysis.

Procedure at the Beginning and at the End of Each Experiment

Experiment beginning: solutions were agitated before use. The dosing device was purged before use. At least 40 mL of AOT were passed through the device to ensure that the device is clean and that all the air bubbles were removed. Experiment end: purge the dosing device in order to remove the AOT solution. Clean the optrode. Soak the optrode in distilled water.

Blank Factor Determination

The variation of AOT and CTAB solutions concentrations, over time, are corrected through the determination of a daily 'blank factor' called ratio R1=V1/m1.

In a 100 mL disposable beaker: 4.9000 g±0.0100 g of the 5.5 g/L CTAB solution (m1) were accurately weighed. The tare was set and 23.0000 g±1.0000 g of distilled water (MwATER) were accurately added. The solution was placed under stirring using a magnetic stirrer at 500 rpm on the dosing device and the titration was started. Stirring speed must strictly be steady throughout the titration without generating too much air bubbles.

V1 is the end point volume of AOT solution required to titrate the CTAB solution m1.

The R1 determination is performed at least in duplicate. If the standard deviation of R1=V1/m1 exceeds 0.010, the titration is repeated until the standard deviation is lower or equal to 0.010. The daily ratio R1 is calculated as the average of the 2 or 3 measurements. Note: the optrode must be washed with distilled water after every measurement and dried with absorbent paper.

CTAB Adsorption on Silica

The moisture content (% $H_2O$) for each silica sample was determined with a thermobalance (temperature: 160° C.) before the adsorption step as follows: tare the balance with an aluminium cup; weigh about 2 g of silica and distribute equally the powder on the cup, close the balance; note the percentage of moisture.

In a 100 mL disposable beaker: 0.0100 g of silica (m0) were accurately weighed. 50.0000 mL+1.0000 mL of the CTAB stock solution (V0) were added. The total mass was recorded. The suspension was stirred for 40 minutes±1 minute on the stirring plate at 450 rpm using magnetic stirring bars with disc ends. After 40 minutes the sample was removed from the stirring plate.

25 to 50 mL of the suspension were transferred in a centrifuge tube (volume depends on centrifuge tube size) and they were centrifuged for 35 minutes at a 10000 rpm speed at 25° C. After centrifugation, the tube was gently removed from the centrifuge not to unsettle the silica. 10 to 20 mL of CTAB solution were transferred in a glass vial which was then stoppered and kept at 25° C.

Titration of the CTAB Solution

In a 100 mL disposable beaker=4.0000 g±0.0100 g of the CTAB solution at unknown concentration (m2) were accurately weighed.

Tare was set and 19.4000 g±1.0000 g of distilled water (Water) were added. The solution was placed under stirring at 500 rpm on the dosing device and the titration with the AOT solution was started.

V2 is the end point volume of AOT required to titrate an amount m2 of CTAB solution.

The CTAB surface area $S_{CTAB}$ is calculated as follows:

$$S_{CTAB} = \frac{R_1 - R_2}{R_1} \times [CTAB]i \times 578.435 \times \frac{V_0}{M_{ES}}$$

wherein: $S_{CTAB}$=surface area of silica (including the moisture content correction) [$m^2/g$]
R1=V1/m1;
m1=mass of the CTAB stock solution titrated as the blank (kg);
V1=end point volume of AOT required to titrate m1 of the CTAB stock solution as the blank (L)
R2=V2/m2;
m2=mass of the CTAB solution titrated after adsorption and centrifugation (kg);
V2=end point volume of AOT required to titrate m2 of the CTAB stock solution after adsorption and centrifugation (L)
[CTAB]i=Concentration of the CTAB stock solution (g/L)
V0=Volume of the CTAB stock solution used for the adsorption on silica (L)
$M_{ES}$=Solid content of silica used for the adsorption (g) corrected for the moisture content as follows:

$$M_{ES} = m0 \times (100 - \% H_2O)/100$$

wherein m0=initial mass of silica (g).

Determination of BET Surface Area

BET surface area $S_{BET}$ was determined according to the Brunauer-Emmett-Teller method as detailed in standard NF ISO 5794-1, Appendix E (June 2010) with the following adjustments: the sample was pre-dried at 160° C.±10° C.; the partial pressure used for the measurement $P/P^0$ was between 0.05 and 0.2.

Determination of the Particle Size Distribution and Particle Size by Centrifugal Sedimentation in a Disc Centrifuge (CPS)

Values of d50, d16, d84 and Ld were determined centrifugal sedimentation in a disc centrifuge using a centrifugal photosedimentometer type "CPS DC 24000UHR", marketed by CPS Instruments company. This instrument is equipped with operating software supplied with the device (operating software version 11g).

Instruments used: for the measurement requirement, the following materials and products were used: Utrasound system: 1500 W generator type Sonics Vibracell VC1500/VCX1500 equipped with 19 mm probe (Converters: CV154+ Boosters (Part No: BHNVC21)+19 mm Probe (Part No: 630-0208)).

Analytical balance with a precision of 0.1 mg (e.g. Mettler AE260); Syringes: 1.0 ml and 2.0 ml with 20 ga needles; high shape glass beaker of 50 mL (SCHOTT DURAN: 38 mm diameter, 78 mm high); magnetic stirrer with a stir bar of 2 cm; vessel for ice bath during sonication.

Chemicals: deionized water; ethanol 96%; sucrose 99%; dodecane, all from Merck; PVC reference standard from CPS Instrument Inc.; the peak maximum of the reference standard used should be between 200 and 600 nm (e.g. 237 nm).

Preparation of the Disc Centrifuge

For the measurements, the following parameters were established. For the calibration standard parameters, the information of the PVC reference communicated by the supplier were used.

| Sample Parameters | | |
|---|---|---|
| max. diameter | μm | 0.79 |
| min. diameter | μm | 0.02 |
| particle density | g/mL | 2.11 |
| particle refrative index | | 1.46 |
| particle absorption | K | 0.001 |
| non-sphericity factor | | 1 |
| Calibration Standard Parameters | | |
| peak diameter | nm | 237 |
| half height peak width | μm | 0.023 |
| particle density | | 1.385 |
| Fluid Parameters | | |
| fluid density | g/mL | 1.051 |
| fluid Refractive Index | | 1.3612 |
| fluid viscosity | cps[x] | 1.28 |

[x]cps = centipoise

System Configuration

The measurement wavelength was set to 405 nm. The following runtime options parameters were established:

| | |
|---|---|
| Force Baseline: | Yes |
| Correct for Non-Stokes: | No |
| Extra Software Noise Filtration: | No |
| Baseline Drift Display: | Show |
| Calibration method: | External |
| Samples per calibration: | 1 |

All the others options of the software are left as set by the manufacturer of the instrument.

Preparation of the Disc Centrifuge

The centrifugal disc is rotated at 24000 rpm during 30 min. The density gradient of sucrose (CAS no 57-50-1) is prepared as follows:

In a 50 mL beaker, a 24% in weight aqueous solution of sucrose is prepared. In a 50 mL beaker, a 8% in weight aqueous solution of sucrose is prepared. Once these two solutions are homogenized separately, samples are taken from each solution using a 2 mL syringe which is injected into the rotating disc in the following order:

Sample 1: 1.8 mL of the 24 wt % solution
Sample 2: 1.6 mL of the 24 wt % solution+0.2 mL of the 8 wt % solution
Sample 3: 1.4 mL of the 24 wt % solution+0.4 mL of the 8 wt % solution
Sample 4: 1.2 mL of the 24 wt % solution+0.6 mL of the 8 wt % solution
Sample 5: 1.0 mL of the 24 wt % solution+0.8 mL of the 8 wt % solution
Sample 6: 0.8 mL of the 24 wt % solution+1.0 mL of the 8 wt % solution
Sample 7: 0.6 mL of the 24 wt % solution+1.2 mL of the 8 wt % solution
Sample 8: 0.4 mL of the 24 wt % solution+1.4 mL of the 8 wt % solution
Sample 9: 0.2 mL of the 24 wt % solution+1.6 mL of the 8 wt % solution
Sample 10: 1.8 mL of the 8 wt % solution Before each injection into the disk, the two solutions are homogenized in the syringe by aspiring about 0.2 mL of air followed by brief manual agitation for a few seconds, making sure not to lose any liquid.

These injections, the total volume of which is 18 mL, aim to create a density gradient useful for eliminating certain instabilities which may appear during the injection of the sample to be measured. To protect the density gradient from evaporation, we add 1 mL of dodecane in the rotating disc using a 2 mL syringe. The disc is then left in rotation at 24000 rpm for 60 min before any first measurement.

Sample Preparation 3.2 g of silica in a 50 mL high shape glass beaker (SCHOTT DURAN: diameter 38 mm, height 78 mm) were weighed and 40 mL of deionized water were added to obtain a 8 wt % suspension of silica. The suspension was stirred with a magnetic stirrer (minimum 20 s) before placing the beaker into a crystallizing dish filled with ice and cold water. The magnetic stirrer was removed and the crystallizing dish was placed under the ultrasonic probe placed at 1 cm from the bottom of the beaker. The ultrasonic probe was set to 56% of its maximum amplitude and was activated for 8 min. At the end of the sonication the beaker was placed again on the magnetic stirrer with a 2 cm magnetic stir bar stirring at minimum 500 rpm until after the sampling.

The ultrasonic probe should be in proper working conditions. The following checks have to be carried out and incase of negative results a new probe should be used: visual check of the physical integrity of the end of the probe (depth of roughness less than 2 mm measured with a fine caliper); the measured d50 of commercial silica Zeosil® 1165MP should be 93 nm±3 nm.

Analysis

Before each samples was analysed, a calibration standard was recorded. In each case 0.1 mL of the PVC standard provided by CPS Instruments and whose characteristics were previously entered into the software was injected. It is important to start the measurement in the software simultaneously with this first injection of the PVC standard. The confirmation of the device has to be received before injecting 100 μL of the previously sonicated sample by making sure that the measurement is started simultaneously at the injection.

These injections were done with 2 clean syringes of 1 mL.

At the end of the measurement, which is reached at the end of the time necessary to sediment all the particles of smaller diameter (configured in the software at 0.02 μm), the ratio for each diameter class was obtained. The curve obtained is called aggregate size distribution.

Results

The values d50, d16, d84 and Ld are on the basis of distributions drawn in a linear scale. The integration of the particle size distribution function of the diameter allows obtaining a "cumulative" distribution, that is to say the total mass of particles between the minimum diameter and the diameter of interest.

d50: is the diameter below and above which 50% of the population by mass is found. The d50 is called median size, that is diameter, of the silica particle.

d84: is the diameter below which 84% of the total mass of particles is measured.

d16: is the diameter below which 16% of the total mass of particles is measured.

Ld: is calculated according to equation: $Ld=(d84-d16)/d50$

Determination of Content of Aluminium

The amount of aluminum was measured using XRF wavelength dispersive X-ray fluorescence spectrometry (using a WDXRF Panalytical instrument). Sample analyses were performed under helium in a 4 cm diameter cell using silica powder contained in the cell covered by a thin Prolene film (4 μm Chemplex®) over a range of 0.1 to 3.0% Al/SiO$_2$.

Al and Si fluorescence were measured using the following parameters: Al Kα angle 2θ=144,9468° (20 s), background signal angle 2θ=–1,2030° (4 s), Si Kα angle 2θ=109,1152° (10 s), tube power 4 kW (32 kV, 125 mA), PE002 crystal and 550 μm collimator, gas flux detector.

The content of aluminium in samples containing over 3.0% Al/SiO$_2$ was determined by means of ICP OES (inductively coupled plasma optical emission spectrometry) after digestion of the sample in fluorhydric acid (eg. 0.2-0.3 g of SiO$_2$ with 1 mL of fluorhydric acid 40%). The limpid solution was diluted in a 5% nitric acid aqueous solution according to the expected Al concentration. The intensity measured on the Al specific wavelength (396.152 nm) was compared to a calibration curve in the range of 0.05 to 2.00 mg/L obtained using aluminum standards (4 standards at 0.10, 0.20, 1.00 and 2.00 mg/L) in similar analytical conditions. The amount in the solid was obtained by calculation using the dilution factor and the dry extract of the silica measured.

Determination of Pore Volume and Size of Pores by Mercury Porosimetry

Pore volume and pore size distribution were determined using a Micromeritics AutoPore® IV 9520 porosimeter; they were calculated by the Washburn relationship with a contact angle theta equal to 140° and a surface tension gamma equal to 485 dynes/cm. Each sample was dried before the measure in an oven at 200° C. for 2 hours at atmospheric pressure. The starting weight of silica placed in the type 10 Penetrometer, having an accuracy of 0.001 g, was selected for good reproducibility of the measurement, in such a way that the "stem volume used", i.e. the percentage mercury (Hg) volume consumed for filling of the penetrometer was from 40% to 80%. The penetrometer was then slowly evacuated to 50 μm of Hg and kept at this pressure for 5 min.

The AutoPore® equipment was operated using Software Version IV 1.09. No corrections were performed on the raw data. The measurement range was from 3.59 kPa (0.52 psi) to 413685 kPa (60000 psi), and at least 100 measurement points were used (19 measurement points from 3.59 kPa (0.52 psi) to 193 kPa (28 psi) with 10 seconds of equilibrium time and then 81 points from 1.93 kPa (0.28 psi) to 413685 kPa (60000 psi) with a 20 seconds equilibrium time). If appropriate, the software introduced further measurement points if the incremental intrusion volume was >0.5 mL/g. The intrusion curve was smoothed by means of the "smooth differentials" function of the equipment software.

The Log Differential Intrusion (mL/g) versus pore size data was analysed in the pore diameter range from 3.5 nm to 5 μm.

Method for the Determination of Z Value

The Z value was measured, after crosslinking, according to the method described by S. Otto and al. in Kautschuk Gummi Kunststoffe, 58 Jahrgang, NR 7-8/2005 in accordance with ISO 11345.

The percentage "area not dispersed" is calculated using a camera observing the surface of the sample in a 30° incident light. The bright points are associated with the charge and the agglomerates, while dark points are associated with the rubber matrix. A digital processing transforms the image into a black and white image, and allows the determination of the percentage "area not dispersed", as described by S. Otto in the document cited above. The more the Z score is high, the better dispersion of the charge in the elastomeric matrix (a Z score of 100 corresponding to a dispersion perfect and a Z score of 0 has a dispersion mediocre).

The calculation of the Z value is based on the percentage area in which the charge is not dispersed as measured by the machine DisperGrader® 1000 supplied with its operative mode and its operating software DisperData by the company Dynisco according to equation:

$$Z = 100 - (\text{percent area not dispersed})/0.35$$

EXAMPLES

Example 1

In a 25 L stainless steel reactor were introduced 16.6 L of purified water and 260 g of Na$_2$SO$_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution (SiO$_2$/Na$_2$O weight ratio=3.4; SiO$_2$ concentration=19.3 wt %) at a flowrate of 115 g/min was introduced in the reactor over a period of 45 s. The same sodium silicate solution was used throughout the process. Next a sodium silicate solution at a flowrate of 115 g/min and a 7.7 wt % sulfuric acid solution at a flowrate of 138 g/min were simultaneously introduced over 14 min period. The flowrate of sulfuric acid was regulated so that the pH of the reaction medium was maintained at a value of 4.63. At the end of this step, sodium silicate at a flowrate of 115 g/min and a 96 wt % sulfuric acid solution were introduced simultaneously over a period of 10 min. The flowrate of the 96 wt % sulfuric acid solution was regulated so that the pH of the reaction medium was maintained at a value of 4.63.

The introduction of acid was then stopped while the addition of sodium silicate was maintained at the same flowrate until the reaction medium reached the pH value of 8.00.

Sodium silicate at a flowrate of 182 g/min and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 182 g/min, a sodium aluminate solution ([Al]: 11.6 wt %-[Na$_2$O]: 19.9 wt %), at a flowrate of 10.5 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica 51.

The properties precipitated silica 51 are reported in Table I.

Example 2

In a 25 L stainless steel reactor were introduced 16.7 L of purified water and 260 g of Na$_2$SO$_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution ($SiO_2/Na_2O$ weight ratio=3.4; $SiO_2$ concentration=19.4 wt %) at a flowrate of 114 g/min was introduced in the reactor over a period of 45 s. The same sodium silicate solution was used throughout the process. Next a sodium silicate solution at a flowrate of 114 g/min and a sulfuric acid solution (7.7 wt %) at a flowrate of 137 g/min were simultaneously introduced over 14 min period. The flowrate of sulfuric acid was regulated so that the pH of the reaction medium was maintained at a value of 4.53. At the end of this step, sodium silicate at a flowrate of 114 g/min and a 96 wt % sulfuric acid solution were introduced simultaneously over a period of 10 min. The 96 wt % sulfuric acid solution flowrate was regulated so that the pH of the reaction medium was maintained at a value of 4.53.

The introduction of acid was then stopped while the addition of sodium silicate was maintained at the same flowrate until the reaction medium reached the pH value of 8.00.

Sodium silicate at a flowrate of 181 g/min and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 181 g/min, a sodium aluminate solution ([Al]: 11.6 wt %-[$Na_2O$]: 19.9 wt %), at a flowrate of 10 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S2.

The properties precipitated silica S2 are reported in Table I.

Example 3

In a 25 L stainless steel reactor were introduced 16.7 L of purified water and 210 g of $Na_2SO_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution ($SiO_2/Na_2O$ weight ratio=3.45; $SiO_2$ concentration=19.4 wt %) at a flowrate of 115 g/min was introduced in the reactor over a period of 45 s. The same sodium silicate solution was used throughout the process. Next a sodium silicate solution at a flowrate of 115 g/min and a 7.7 wt % sulfuric acid solution at a flowrate of 140 g/min were simultaneously introduced over 14 min period. The flowrate of sulfuric acid was regulated so that the pH of the reaction medium was maintained at a value of 4.50. At the end of this step, sodium silicate at a flowrate of 115 g/min and a 96 wt % sulfuric acid solution were introduced simultaneously over a period of 10 min. The 96 wt % sulfuric acid solution flowrate was regulated so that the pH of the reaction medium was maintained at a value of 4.50.

The introduction of acid was then stopped while the addition of sodium silicate was maintained at the flowrate of 93 g/min until the reaction medium reached the pH value of 8.00.

Sodium silicate at a flowrate of 181 g/min and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 181 g/min, a sodium aluminate solution ([Al]: 11.6 wt %-[$Na_2O$]: 19.9 wt %), at a flowrate of 10 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S3.

The properties precipitated silica S3 are reported in Table I.

Example 4

In a 25 L stainless steel reactor were introduced at room temperature 16.7 L of purified water and 260 g of $Na_2SO_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution ($SiO_2/Na_2O$ weight ratio=3.4; $SiO_2$ concentration=19.3 wt %) at a flowrate of 115 g/min was introduced in the reactor over a period of 45 s. The same sodium silicate solution was used throughout the process. Next a sodium silicate solution at a flowrate of 115 g/min and a 7.7 wt % sulfuric acid solution at a flowrate of 139 g/min were simultaneously introduced over 14 min period. The flowrate of sulfuric acid was regulated so that the pH of the reaction medium was maintained at a value of 3.97. At the end of this step, sodium silicate at a flowrate of 115 g/min and a 96 wt % sulfuric acid solution were introduced simultaneously over a period of 10 min. The 96 wt % sulfuric acid solution flowrate was regulated so that the pH of the reaction medium was maintained at a value of 3.97.

The introduction of acid was then stopped while the addition of sodium silicate was maintained at the same flowrate until the reaction medium reached the pH value of 8.00.

Sodium silicate at a flowrate of 182 g/min and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 182 g/min, a sodium aluminate solution ([Al]: 11.6 wt %-[$Na_2O$]: 19.9 wt %), at a flowrate of 10 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S4.

The properties precipitated silica S4 are reported in Table I.

Example 5

In a 25 L stainless steel reactor were introduced 16.7 L of purified water and 260 g of $Na_2SO_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution ($SiO_2/Na_2O$ weight ratio=3.4; $SiO_2$ concentration=19.3 wt %) at a flowrate of 114 g/min was introduced in the reactor over a period of 45 s. The same sodium silicate solution was used throughout the process. Next a sodium silicate solution at a flowrate of 114 g/min and a 7.7 wt % sulfuric acid solution at a flowrate of 142 g/min were simultaneously introduced over 14 min period. The flowrate of sulfuric acid was regulated so that the pH of the reaction medium was maintained at a value of 3.74. At the end of this step, sodium silicate at a flowrate of 115 g/min and a 96 wt % sulfuric acid solution were introduced simultaneously over a period of 10 min. The 96 wt % sulfuric acid solution flowrate was regulated so that the pH of the reaction medium was maintained at a value of 3.74.

The introduction of acid was then stopped while the addition of sodium silicate was maintained at the same flowrate until the reaction medium reached the pH value of 8.00.

Sodium silicate at a flowrate of 182 g/min and a 96 wt % sulfuric acid solution were then introduced simultaneously over a period of 3 min. The flowrate of the 96% sulfuric acid solution was regulated so that the pH of the reaction medium was maintained at a value of 8.00.

Simultaneously, over a period of 15 min, were introduced: sodium silicate, at a flowrate of 182 g/min, a sodium aluminate solution ([Al]: 11.6 wt %-[$Na_2O$]: 19.9 wt %), at a flowrate of 10 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S5. The properties precipitated silica S5 are reported in Table I.

Example 6

In a 25 L stainless steel reactor were introduced 16.7 L of purified water and 260 g of $Na_2SO_4$ (solid). The obtained solution was stirred and heated to reach 92° C. The entire reaction was carried out at this temperature and under stirring to maintain a homogeneous reaction medium. Sulfuric acid (concentration: 7.7 wt %) was introduced into the reactor to reach a pH value of 3.90.

A sodium silicate solution ($SiO_2/Na_2O$ weight ratio=3.42; $SiO_2$ concentration=19.1 wt %) at a flowrate of 116 g/min was introduced in the reactor over a period of 45 s. The same sodium silicate solution was used throughout the process. Next a sodium silicate solution at a flowrate of 116 g/min and a sulfuric acid solution at a flowrate of 139 g/min were simultaneously introduced over 14 min period. The flowrate of sulfuric acid was regulated so that the pH of the reaction medium was maintained at a value of 3.85. At the end of this step, sodium silicate at a flowrate of 115 g/min and a 96 wt % sulfuric acid solution were introduced simultaneously over a period of 10 min. The 96 wt % sulfuric acid solution flowrate was regulated so that the pH of the reaction medium was maintained at a value of 4.00.

The introduction of acid was then stopped while the addition of sodium silicate was maintained at the flowrate of 120 g/min until the reaction medium reached the pH value of 8.00.

Sodium silicate at a flowrate of 182 g/min and a 96 wt % sulfuric acid solution were then introduced simultaneously over a period of 3 min. The flowrate of the 96% sulfuric acid solution was regulated so that the pH of the reaction medium was maintained at a value of 8.00.

Simultaneously, over a period of 15 min, were introduced: sodium silicate, at a flowrate of 182 g/min, a sodium aluminate solution ([Al]: 11.6 wt %-[$Na_2O$]: 19.9 wt %), at a flowrate of 4 g/min, and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.80 with 96 wt % sulfuric acid. The reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S6.

The properties precipitated silica S6 are reported in Table I.

Example 7

In a 2500 L stainless steel reactor were introduced 1129 L of water and 29.7 kg of $Na_2SO_4$ (solid). The obtained solution was stirred and heated to reach 92° C. The entire reaction was carried out at this temperature and under stirring to maintain a homogeneous reaction medium. A 96 wt % sulfuric acid solution was introduced into the reactor to reach a pH value of 3.90. A sodium silicate solution ($SiO_2/Na_2O$ weight ratio=3.46; $SiO_2$ concentration=19.4 wt %) at a flowrate of 353 L/h was introduced in the reactor over a period of 61 s. The same sodium silicate solution was used throughout the process. Next a sodium silicate solution at a flowrate of 445 L/h, a water flowrate of 575 L/h and a 96 wt % sulfuric acid solution were simultaneously introduced over 15 min period. The flowrate of sulfuric acid was regulated so that the pH of the reaction medium was maintained at a value of 3.90.

At the end of this step, sodium silicate at a flowrate of 445 L/h and a 96 wt % sulfuric acid solution were introduced simultaneously over a period of 9 min. The 96 wt % sulfuric acid solution flowrate was regulated so that the pH of the reaction medium was maintained at a value of 3.90. The introduction of acid was then stopped while the addition of sodium silicate was maintained at the flowrate of 582 L/h until the reaction medium reached the pH value of 8.00.

Sodium silicate at a flowrate of 703 L/h and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 703 L/h, a sodium aluminate solution ([Al]: 13.2 wt %, [$Na_2O$]: 22.9 wt %), at a flowrate of 47.6 kg/h and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.50 with 96 wt % sulfuric acid. Then water is introduced to decrease the temperature at 85° C. and the reaction mixture was matured for 5 minutes. A slurry was obtained.

The reaction slurry was filtered and washed on a filter press. The cake obtained was disintegrated mechanically. The resulting slurry was dried by means of a nozzle spray dryer to obtain precipitated silica S7.

The properties precipitated silica S7 are reported in Table I.

Example 8

In a 2500 L stainless steel reactor were introduced 1124 L of water and 29.7 kg of $Na_2SO_4$ (solid). The obtained solution was stirred and heated to reach 92° C. The entire reaction was carried out at this temperature under stirring to maintain a homogeneous reaction medium. A 96 wt % sulfuric acid solution was introduced into the reactor to reach a pH value of 3.90. A sodium silicate solution ($SiO_2$/$Na_2O$ weight ratio=3.38; $SiO_2$ concentration=19.1 wt %) at a flowrate of 367 L/h was introduced in the reactor over a period of 59 s. The same sodium silicate solution was used throughout the process. Next a sodium silicate solution at a flowrate of 445 L/h, a water flowrate of 575 L/h and a 96 wt % sulfuric acid solution were simultaneously introduced over 15 min period. The flowrate of sulfuric acid was regulated so that the pH of the reaction medium was maintained at a value of 3.90. At the end of this step, sodium silicate at a flowrate of 445 L/h and a 96 wt % sulfuric acid solution were introduced simultaneously over a period of 9 min. The 96 wt % sulfuric acid solution flowrate was regulated so that the pH of the reaction medium was maintained at a value of 3.90.

The introduction of acid was then stopped while the addition of sodium silicate was put at the flowrate of 591 L/h until the reaction medium reached the pH value of 8.00.

Sodium silicate at a flowrate of 706 L/h and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 706 L/h, a sodium aluminate solution ([Al]: 12.2 wt %-[$Na_2O$]: 19.4 wt %), at a flowrate of 47.6 kg/h and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.50 with 96 wt % sulfuric acid. Then water is introduced to decrease the temperature to 85° C. and the reaction mixture was matured for 5 minutes. A slurry was obtained. The reaction slurry was filtered and washed on a filter press. The cake obtained was disintegrated mechanically. The resulting slurry was dried by means of a nozzle spray dryer to obtain precipitated silica S8.

The properties of precipitated silica S8 are reported in Table I.

Example 9

In a 2500 L stainless steel reactor were introduced 1123 L of water and 29.7 kg of $Na_2SO_4$ (solid). The obtained solution was stirred and heated to reach 92° C. The entire reaction was carried out at this temperature. A 96 wt % sulfuric acid solution was introduced into the reactor to reach a pH value of 3.90. A sodium silicate solution ($SiO_2$/$Na_2O$ ratio=3.43; $SiO_2$ concentration=19.2 wt %) at a flowrate of 380 L/h was introduced in the reactor over a period of 59 s. The same sodium silicate solution was used throughout the process. Next a sodium silicate solution at a flowrate of 445 L/h, a water flowrate of 575 L/h and a 96 wt % sulfuric acid solution were simultaneously introduced over 15 min period. The flowrate of sulfuric acid was regulated so that the pH of the reaction medium was maintained at a value of 4.5. At the end of this step, sodium silicate at a flowrate of 445 L/h and a 96 wt % sulfuric acid solution were introduced simultaneously over a period of 9.5 min. The 96 wt % sulfuric acid solution flowrate was regulated so that the pH of the reaction medium was maintained at a value of 4.5.

The introduction of acid was then stopped while the addition of sodium silicate was put at the flowrate of 592 L/h until the reaction medium reached the pH value of 8.00.

Sodium silicate at a flowrate of 706 L/h and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 706 L/h, a sodium aluminate solution ([Al]: 12.2 wt %-[$Na_2O$]: 19.4 wt %), at a flowrate of 47.6 kg/h and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.7 with 96 wt % sulfuric acid. Then water is introduced to decrease the temperature to 85° C. and the reaction mixture was matured for 5 minutes. A slurry was obtained. The reaction slurry was filtered and washed on a filter press. The cake obtained was disintegrated mechanically. The resulting slurry was dried by means of a nozzle spray dryer to obtain precipitated silica S9. The properties of precipitated silica S9 are reported in Table I.

Example 10

In a 2500 L stainless steel reactor were introduced 1124 L of water and 29.7 kg of $Na_2SO_4$ (solid). The obtained solution was stirred and heated to reach 92° C. The entire reaction was carried out at this temperature. A 96 wt % sulfuric acid solution was introduced into the reactor to reach a pH value of 3.90. A sodium silicate solution ($SiO_2$/

Na$_2$O ratio=3.39; SiO$_2$ concentration=19.2 wt %) at a flowrate of 367 L/h was introduced in the reactor over a period of 59 s. The same sodium silicate solution was used throughout the process. Next a sodium silicate solution at a flowrate of 445 L/h, a water flowrate of 575 L/h and a 96 wt % sulfuric acid solution were simultaneously introduced over 15 min period. The flowrate of sulfuric acid was regulated so that the pH of the reaction medium was maintained at a value of 3.90. At the end of this step, sodium silicate at a flowrate of 445 L/h and a 96 wt % sulfuric acid solution were introduced simultaneously over a period of 9.5 min. The 96 wt % sulfuric acid solution flowrate was regulated so that the pH of the reaction medium was maintained at a value of 3.90.

The introduction of acid was then stopped while the addition of sodium silicate was put at the flowrate of 591 L/h until the reaction medium reached the pH value of 8.00.

Sodium silicate at a flowrate of 706 L/h and a 96 wt % sulfuric acid solution were then introduced simultaneously over a period of 3 min. The flowrate of the 96 wt % sulfuric acid solution was regulated so that the pH of the reaction medium was maintained at a value of 8.00.

Simultaneously, over a period of 15 min, were introduced: sodium silicate, at a flowrate of 706 L/h, a sodium aluminate solution ([Al]: 12.2 wt %-[Na$_2$O]: 19.4 wt %), at a flowrate of 47.6 kg/h and a 96 wt % sulfuric acid solution. The flowrate of the 96 wt % sulfuric acid solution was regulated so that the pH of the reaction medium was maintained at a value of 8.00.

At the end of this simultaneous addition, the pH of the reaction medium was brought to a value of 4.60 with 96 wt % sulfuric acid. Then water is introduced to decrease the temperature to 85° C. and the reaction mixture was matured for 5 minutes. A slurry was obtained. Each reaction slurry was filtered and washed on a filter press. The cake obtained was disintegrated mechanically. The resulting slurry was dried by means of a nozzle spray dryer to obtain precipitated silica S10. The properties of precipitated silica S10 are reported in Table I.

Comparative Example 1

Example 2 of WO03/106339 A1 was reproduced as described. The properties of precipitated silica CS1 are reported in Table I.

Comparative Example 2

Example 2 of WO2011/117400 A1 was reproduced as described changing the amount of Al to 1.4 wt % rather than 2.7 wt % and adjusting the CTAB specific surface $S_{CTAB}$ to a value around 150 m$^2$/g rather than 135 m$^2$/g by reducing the initial temperature from 83 to 81° C. The properties of precipitated silica CS2 are reported in Table I.

Comparative Example 3

Example 3 of WO96/30304 A1 was reproduced essentially as described. The properties of precipitated silica CS3 are reported in Table I.

TABLE I

| Silica | $S_{CTAB}$ (m$^2$/g) | $S_{BET}$ (m$^2$/g) | ($S_{BET}$ − $S_{CTAB}$) (m$^2$/g) | CPS d16 (nm) | CPS d50 (nm) | CPS d84 (nm) | Ld | $W_{Al}$ (%) | A |
|---|---|---|---|---|---|---|---|---|---|
| S1  | 115 | 188 | 73  | 102 | 199 | 439 | 1.7 | 1.4 | 277 |
| S2  | 137 | 207 | 70  | 87  | 166 | 389 | 1.8 | 1.4 | 261 |
| S3  | 152 | 234 | 82  | 78  | 150 | 368 | 1.9 | 1.4 | 257 |
| S4  | 214 | 286 | 72  | 66  | 119 | 288 | 1.9 | 1.4 | 274 |
| S5  | 230 | 296 | 66  | 60  | 105 | 261 | 1.9 | 1.4 | 273 |
| S6  | 203 | 258 | 55  | 64  | 111 | 248 | 1.7 | 0.6 | 265 |
| S7  | 202 | 263 | 61  | 60  | 123 | 288 | 1.9 | 1.3 | 270 |
| S8  | 199 | 267 | 68  | 67  | 121 | 291 | 1.9 | 1.7 | 262 |
| S9  | 146 | 206 | 60  | 87  | 168 | 411 | 1.9 | 1.4 | 270 |
| S10 | 198 | 258 | 60  | 68  | 127 | 306 | 1.9 | 1.4 | 270 |
| CS1 | 146 | 255 | 109 | 66  | 135 | 316 | 1.9 | 1.4 | 237 |
| CS2 | 152 | 177 | 25  | 64  | 101 | 199 | 1.3 | 1.4 | 208 |
| CS3 | 214 | 217 | 3   | 53  | 81  | 138 | 1.1 | 1.0 | 240 |

As shown in Table II, when compared to known precipitated silica containing Al at comparable CTAB surface, the inventive silica is generally characterized by a larger Mode, that is by a larger average size of pores.

TABLE II

| Silica | $S_{CTAB}$ (m$^2$/g) | $S_{BET}$ (m$^2$/g) | Vpt (mL/g) | Mode (2$^{nd}$ intrusion) (nm) |
|---|---|---|---|---|
| S3  | 152 | 234 | 3.61 | 51.4 |
| CS1 | 146 | 255 | 4.86 | 25.6 |
| CS2 | 152 | 177 | 3.47 | 29.1 |
| S7  | 202 | 263 | 3.43 | 20.0 |
| CS3 | 214 | 217 | 3.20 | 16.6 |

Example 11—Comparative Examples 4-5

Elastomeric compositions were prepared in an internal mixer of Brabender type (70 mL). The compositions, expressed as parts by weight per 100 parts of elastomers (phr), are described in Table III below:

TABLE III

| Composition | Example 11 | Comp. Example 4 | Comp. Example 5 |
|---|---|---|---|
| F-SBR | 80 | 80 | 80 |
| BR | 20 | 20 | 20 |
| Silica S3 | 90 | | |
| Silica CS1 | | 90 | |
| Silica CS2 | | | 90 |
| TESPD | 6.2 | 6.2 | 6.2 |
| Carbon black | 3.0 | 3.0 | 3.0 |
| ZnO | 2.5 | 2.5 | 2.5 |
| Stearic acid | 2.0 | 2.0 | 2.0 |
| 6PPD | 1.9 | 1.9 | 1.9 |
| TDAE oil | 30.0 | 30.0 | 30.0 |
| DPG | 2.5 | 2.5 | 2.5 |
| CBS | 1.5 | 1.5 | 1.5 |
| Sulfur | 1.6 | 1.6 | 1.6 |
| TBzTD | 0.2 | 0.2 | 0.2 |

F-SBR: Functionalized solution SBR from JSR with 59% of vinyl units; 27% of styrene units; Tg of −28° C.;
BR: Butyl Rubber Buna CB 25 from Lanxess
TESPD: Bis[3-(triethoxysilyl)propyl]disulfide, Xiameter Z-6920 from Dow Corning
6PPD: N-(1,3-Dimethylbutyl)-N-phenyl-para-phenylenediamine, Santoflex 6-PPD from Flexsys
DPG: Diphenylguanidine, Rhenogran DPG-80 from RheinChemie
CBS: N-Cyclohexyl-2-benzothiazolesulfenamide, Rhenogran CBS-80 from RheinChemie
TBzTD: Tetrabenzylthiuram disulfide, Rhenogran TBzTd-70 from Rhein Chemie Process for the Preparation of the Rubber Compositions:

The process for the preparation of the rubber compositions was performed in two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (capacity of 70 ml). The filling coefficient was 0.75. The initial temperature and the speed of the rotors were set so as to achieve mixture dropping temperatures of approximately 150-170° C.

In a first pass of the first phase the elastomers and the reinforcing filler (introduction in instalments) were mixed with the coupling agent and the stearic acid. The duration was between 4 and 10 minutes.

After cooling the mixture (temperature of less than 100° C.), a second pass made it possible to incorporate the zinc oxide and the protecting agents/antioxidants (in particular 6-PPD). The duration of this pass was between 2 and 5 minutes. The filling coefficient was 0.73.

After cooling the mixture (temperature of less than 100° C.), the vulcanization system (sulfur and accelerators, such as CBS) were added during the second phase. It was carried out on an open mill, preheated to 50° C. The duration of this phase was between 2 and 6 minutes.

Each final mixture was subsequently calendered in the form of plaques with a thickness of 2-3 mm.

The evaluation of the rheological properties of the "raw" (uncured) mixtures makes it possible to optimize the vulcanization time and the vulcanization temperature.

Subsequently, the mechanical and dynamic properties of the mixtures vulcanized at the curing optimum (T98) were measured.

Rheological Properties

The measurements were carried out on the compositions in the raw state. The results relating to the rheology test, which was carried out at 160° C. using a Monsanto ODR rheometer according to the standard NF ISO 3417, are given in Table III.

The following were determined from the curve of variation in the torque as a function of time:
- the minimum torque (Tmin), which reflects the viscosity of the composition at the temperature under consideration;
- the maximum torque (Tmax);
- the time T90 necessary to obtain a vulcanization state corresponding to 90% of complete vulcanization;
- the time T98 necessary to obtain a vulcanization state corresponding to 98% of complete vulcanization (this time is taken as vulcanization optimum);
- and the scorch time TS2, corresponding to the time necessary in order to have a rise of 2 points above the minimum torque at the temperature under consideration (160° C.) and which reflects the time during which it is possible to process the raw mixtures at this temperature without having initiation of vulcanization (the mixture cures from TS2).

The results obtained are shown in Table IV.

Properties of the Vulcanisates

The measurements were carried out on the optimally vulcanized compositions (T98) for a temperature of 160° C.

Uniaxial tensile tests were carried out in accordance with the instructions of the standard NF ISO 37 with test specimens of H2 type at a rate of 500 mm/min on an Instron 5564 device. The x % moduli, corresponding to the stress measured at x % of tensile strain, are expressed in MPa.

The Shore A hardness measurement on the vulcanisates was carried out according to standard ASTM D 2240. The given value was measured at 3 seconds.

The values for the loss factor (tan δ) and the dynamic tensile elastic modulus (E') were recorded on vulcanized samples (cylindrical samples, section 95 mm$^2$ and 14 mm high). The sample was subjected to a pre-strain at 10% sinusoidal deformation, and dynamic solicitation of 4%. Measurement are performed at 60° C. and 10 Hz frequency on a Metravib VA 3000.

The properties measured are reported in Table IV.

TABLE IV

| | Example 11 | Comp. Example 4 | Comp. Example 5 |
|---|---|---|---|
| Tmin (dN · m) | 11.2 | 10.7 | 14.2 |
| Tmax (dN · m) | 70.7 | 73.8 | 76.7 |
| TS2 (min) | 5.1 | 7.1 | 5.0 |
| T90 (min) | 9.5 | 11.4 | 8.5 |
| 10% Modulus (MPa) | 0.7 | 0.7 | 0.7 |
| 100% Modulus (MPa) | 3.0 | 2.8 | 2.9 |
| 300% Modulus (MPa) | 12.2 | 12.7 | 13.8 |
| Elongation at break (%) | 371 | 348 | 332 |
| Tensile strength (MPa) | 15.9 | 15.3 | 15.8 |
| Shore A hardness - 3 s (pts) | 61 | 59 | 63 |
| E'(60° C.) (compression) | 6.7 | 6.2 | 7.2 |
| Tan δ (60° C.) (compression) | 0.106 | 0.100 | 0.113 |
| Z value | 78 | 67 | 84 |

With respect to the composition of Comparative Example 4 the composition of Example 11, containing silica S3, exhibits higher elongation at break and a better ability to disperse (Z value) in the elastomeric composition. The difference in the ability of different fillers to disperse in a given elastomeric composition can be considered as significant when Z values differ by about 10 points. With respect to the composition of Comparative Example 5 the composition of Example 11, containing silica S3, exhibits higher elongation at break and a reduced energy dissipation (tan δ (60° C.)) which is related to lower heat build-up.

Example 12—Comparative Example 6

Elastomeric compositions were prepared in an internal mixer of Brabender type (380 mL). The compositions, expressed as parts by weight per 100 parts of elastomers (phr), are described in Table V.

TABLE V

| Composition | Example 12 | Comp. Example 6 |
|---|---|---|
| s-SBR | 110 | 110 |
| BR | 20 | 20 |
| Silica S9 | 100 | |
| Silica CS1 | | 100 |
| TESPT | 7.5 | 7.5 |
| Carbon black | 3.0 | 3.0 |
| ZnO | 1.2 | 1.2 |
| Stearic acid | 2.0 | 2.0 |
| 6PPD | 2.5 | 2.5 |
| Resin | 20.0 | 20.0 |

TABLE V-continued

| Composition | Example 12 | Comp. Example 6 |
|---|---|---|
| DPG | 2.4 | 2.4 |
| CBS | 2.3 | 2.3 |
| Sulfur | 1.0 | 1.0 |

S-SBR: oil extended solution SBR, Buna VSL4526-2HM from Lanxess with 45% of vinyl units; 26% of styrene units; Tg of −30° C., 37.5 phr of TDAE
BR: Butyl rubber, Buna CB 25 from Lanxess
Silica CS1: silica prepared following the procedure of Example 2 of WO03/106339
TESPT: Bis[3-(triethoxysilyl)propyl]tetrasulfide, Luvomaxx, from LEVOSS France sarl
6-PPD: N-(1,3-Dimethylbutyl)-N-phenyl-para-phenylenediamine, Santoflex from Flexsys
DPG: diphenylguanidine, Rhenogran DPG-80 from RheinChemie
Resin: polyterpene resin, Sylvares TR 5147 from ARIZONA CHEMICAL
CBS: N-Cyclohexyl-2-benzothiazolesulfenamide, Rhenogran CBS-80 from Rhein Chemie Process for the Preparation of the Rubber Compositions The process for the preparation of the rubber compositions was performed in two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (capacity of 380 mL). The initial temperature and the speed of the rotors were set so as to achieve mixture dropping temperatures of approximately 160° C.

During the first phase the elastomers, the reinforcing fillers (introduction in instalments) were mixed with the coupling agent and the other additives (DPG, stearic acid, resin, ZnO, 6-PPD). The duration was between 5 min and 7 min.

After cooling the mixture (temperature of less than 100° C.), the vulcanization system were added during the second phase. It was carried out on an open mill, preheated to 50° C. The duration of this phase was between 2 and 6 minutes.

Each final mixture was subsequently calendered in the form of plaques with a thickness of 2-3 mm.

Properties of the Vulcanisates

The measurements were carried out after vulcanization at 160° C. The modulus was measured as previously described.

The values for the loss factor (tan δ) and amplitude of elastic modulus in dynamic shear (ΔG') were recorded on vulcanized samples (parallelepiped specimen of cross section 8 mm² and of height 7 mm). The sample is subjected to a double alternating sinusoidal shear strain at a temperature of 40° C. and at a frequency of 10 Hz. The strain amplitude sweeping processes were performed according to an outward-return cycle, proceeding outward from 0.1% to 50% and then returning from 50% to 0.1%. The values reported in Table VI are obtained from the return strain amplitude scanning and concern the maximum value of the loss factor (tan δ max) and the amplitude of the elastic modulus (ΔG') between the values at 0.1% and 50% of strain (Payne effect).

TABLE VI

| | Example 12 | Comp. Example 6 |
|---|---|---|
| 10% Modulus (MPa) | 0.5 | 0.6 |
| 200% Modulus (MPa) | 8.3 | 7.7 |
| 300% Modulus (MPa) | 13.9 | 13.9 |
| G'0, second-G'50 (Mpa) | 1.3 | 1.8 |
| Tan δ max (shear) | 0.211 | 0.264 |

The composition of Example 12 containing the inventive silica exhibits significantly reduced energy dissipation values (ΔG' and tan δ max) and good mechanical properties with respect to the composition of containing a precipitated silica according to the prior art.

Example 13

The precipitated silica of the invention may be advantageously used as a catalyst or catalyst support. The ability of the inventive silica to catalyze the transformation of 2-methyl-3-butyn-2-ol to 3-methyl-3-buten-1-yne was compared with that of a prior art silica using the test described by Pernot et al. in Applied Catalysis, 1991, vol. 78, p. 213, following the procedure described hereafter.

An amount of 100 mg of silica was placed in a Pyrex reactor. The silica was subjected to a pretreatment at 180° C. for 2 h under a $N_2$ gas flow at a flow rate of 20 mL/min.

The temperature in the reactor was set at 180° C. Given amounts of 2-methyl-3-butyn-2-ol were periodically injected into the reactor by feeding, over the course of 2 minutes, a mixture of 1.73 kPa of 2-methyl-3-butyn-2-ol in $N_2$ with a flow rate of 20 mL/min, which corresponds to an hourly molar flow rate of 2-methyl-3-butyn-2-ol of 0.85 mmol/h.

At the end of each injection, the gas stream at the reactor outlet was analysed by gas chromatography to determine the nature of the reaction products and their amount.

The degree of conversion ($DC_t$) of 2-methyl-3-butyn-2-ol during the test at a given time (t) was calculated according to the following formula:

$$DC_t = (C_{ini} - C_t)/C_{ini}$$

where $C_{ini}$ is the amount of 2-methyl-3-butyn-2-ol before the reaction and $C_t$ represents the amount of 2-methyl-3-butyn-2-ol at the time t of the reaction.

The selectivity ($S_i$) for the conversion of 2-methyl-3-butyn-2-ol into 3-methyl-3-buten-1-yne, defined as the proportion of 3-methyl-3-buten-1-yne in the gaseous stream at the exit of the reactor with respect to the total amount of products identified in said gaseous stream, was calculated according to the following formula:

$$S_i = C_i / \Sigma_i$$

where $C_i$ is the amount of the product i and $\Sigma$ represents the sum of the reaction products identified by gas chromatography in the gaseous stream at the exit of the reactor.

After 20 minutes of reaction the following was observed:

| | Silica S10 | Silica CS1 |
|---|---|---|
| $DC_t$ 2-methyl-3-butyn-2-ol | 69% | 6% |
| Selectivity $S_{(3-methyl-3-buten-1-yne)}$ | 96% | 90% |

The silica of the invention exhibits a higher degree of conversion of the starting material, 2-methyl-3-butyn-2-ol, as well as a higher selectivity in the target product (3-methyl-3-buten-1-yne) with respect to the silica of the prior art.

The invention claimed is:
1. A precipitated silica characterised by:
a CTAB surface area $S_{CTAB}$ in a range from 70 to 300 m²/g;
a difference between a BET surface area $S_{BET}$ and the CTAB surface area $S_{CTAB}$ in a range from 35 to 300 m²/g;

a width of a particle size distribution Ld, measured by centrifugal sedimentation, in a range from 1.5 to 3.5;
an amount of aluminium $W_{Al}$ in a range from 0.5 to 5.0 wt %; and
a median particle size d50 measured by centrifugal sedimentation is greater than 30 nm, and does not exceed 300 nm, wherein the median particle size d50, the CTAB surface area $S_{CTAB}$ and the amount of aluminium $W_{Al}$ are such that parameter A defined by equation (I):

$$A=|d50|+0.782\times|S_{CTAB}|-8.524\times|W_{Al}| \quad (I)$$

satisfies relationship (II):

$$A\geq 253 \text{ and } A\leq 300 \quad (II)$$

wherein:
|d50| represents a numerical value of the median particle size d50 measured by centrifugal sedimentation and expressed in nm; $|S_{CTAB}|$ represents a numerical value of the CTAB surface area $S_{CTAB}$ expressed in m²/g; and $|W_{Al}|$ represents a numerical value of e the amount of aluminium $W_{Al}$.

2. The precipitated silica according to claim 1, wherein the CTAB surface area $S_{CTAB}$ is in the range from 110 to 300 m²/g.

3. The precipitated silica according to claim 1, wherein 259≤A≤300.

4. The precipitated silica of claim 1, wherein the difference between the BET surface area $S_{BET}$ and the CTAB surface area $S_{CTAB}$ is at least 40 m²/g.

5. The precipitated silica according to claim 4, wherein the difference between the BET surface area $S_{BET}$ and the CTAB surface area $S_{CTAB}$ is at least 50 m²/g.

6. The precipitated silica of claim 1, wherein the BET surface area $S_{BET}$ is at least 160 m²/g.

7. The precipitated silica according to claim 6, wherein the BET surface area $S_{BET}$ is at least 180 m²/g.

8. The precipitated silica according to claim 1, wherein the amount of aluminium ($W_{Al}$) is in the range from 1.0 to 3.0 wt %.

9. The precipitated silica according to claim 1, wherein the amount of aluminium ($W_{Al}$) is in the range from 0.8 to 3.5 wt %.

10. The precipitated silica according to claim 1, wherein the CTAB surface area $S_{CTAB}$ does not exceed 280 m²/g.

11. The precipitated silica according to claim 10, wherein the amount of aluminium ($W_{Al}$) is in the range from 0.8 to 3.0 wt % and the median particle size d50 is equal to or greater than 65 nm.

12. The precipitated silica according to claim 11, wherein the median particle size d50 is equal to or greater than 80 nm.

13. The precipitated silica according to claim 12, wherein the width of the particle size distribution Ld is from 1.5 to 2.5.

14. The precipitated silica according to claim 1, wherein 255≤A≤288.

15. The precipitated silica according to claim 1, wherein the difference between the BET surface area $S_{BET}$ and the CTAB surface area $S_{CTAB}$ is in the range from 55 to 150 m²/g.

16. The precipitated silica according to claim 15, characterised by:
the CTAB surface area $S_{CTAB}$ in the range from 110 to 300 m²/g;
the difference between the BET surface area $S_{BET}$ and the CTAB surface area $S_{CTAB}$ in the range from 50 to 300 m²/g;
the width of the particle size distribution Ld, measured by centrifugal sedimentation, in the range from 1.5 to 2.5;
the amount of aluminium $W_{Al}$ in the range from 0.8 to 3.0 wt %; and
the median particle size d50 measured by centrifugal sedimentation is equal to or greater than 65 nm, and does not exceed 300 nm, wherein the median particle size d50, the CTAB surface area $S_{CTAB}$ and the amount of aluminium $W_{Al}$ are such that parameter A defined by equation (I):

$$A=|d50|+0.782\times|S_{CTAB}|-8.524\times|W_{Al}| \quad (I)$$

satisfies relationship (II):

$$259\leq A\leq 300 \quad (II)$$

wherein:
|d50| represents the numerical value of the median particle size d50 measured by centrifugal sedimentation and expressed in nm; $|S_{CTAB}|$ represents the numerical value of the CTAB surface area $S_{CTAB}$ expressed in m²/g; and $|W_{Al}|$ represents the numerical value of the amount of aluminium $W_{Al}$.

17. The precipitated silica according to claim 16, wherein A≤285.

18. The precipitated silica according to claim 17, wherein the difference between the BET surface area $S_{BET}$ and the CTAB surface area $S_{CTAB}$ is in the range from 55 to 150 m²/g.

19. The precipitated silica according to claim 16, wherein the difference between the BET surface area $S_{BET}$ and the CTAB surface area $S_{CTAB}$ is in the range from 55 to 150 m²/g.

20. A process for preparing the precipitated silica of claim 1, said process comprising:
(i) providing a starting solution having a pH from 2.00 to 5.00,
(ii) simultaneously adding a silicate and an acid to said starting solution forming a reaction medium such that a pH of the reaction medium is maintained in a range from 2.00 to 5.00,
(iii) stopping the addition of the acid and of the silicate and adding a base to the reaction medium to raise the pH of said reaction medium to a value in a range from 7.00 to 10.00,
(iv) simultaneously adding to the reaction medium at least one compound of aluminium, the silicate and the acid, such that the pH of the reaction medium is maintained in a range from 7.00 to 10.00,
(v) stopping the addition of the silicate and of the at least one compound of aluminium while continuing the addition of the acid to the reaction medium to reach a pH of the reaction medium of less than 6.00 and obtaining the precipitated silica of claim 1.

21. The process according to claim 20, wherein in step (iii) the addition of the acid is stopped while continuing the addition of the silicate to the reaction medium to raise the pH of said reaction medium to a value in the range from 7.00 to 10.00.

22. The process according to claim 20, further comprising a step (ii') between step (i) and step (ii), wherein the silicate and the acid are added to the starting solution such that the pH of the reaction medium is maintained in the range from 2.00 to 9.50.

23. The process according to claim 20, wherein the aluminium compound is an alkali metal aluminate.

24. A composition comprising the precipitated silica of claim 1 and at least one polymer.

25. The composition of claim 24, wherein the at least one polymer is selected from the group of elastomers.

26. An article comprising the composition of claim 24.

27. The article of claim 26 in the form of a footwear sole, floorcovering, gas barrier, roller for cableways, seal for domestic electrical appliances, seal for liquid or gas pipes, braking system seal, pipe, sheathing, cable, engine support, battery separator, conveyor belt, or transmission belt.

* * * * *